US011383919B2

(12) United States Patent
Kuch et al.

(10) Patent No.: US 11,383,919 B2
(45) Date of Patent: Jul. 12, 2022

(54) TRANSPORT CASE FOR A FOLDING BICYCLE

(71) Applicant: B&W International GmbH, Ibbenbüren (DE)

(72) Inventors: Andreas Kuch, Osnabrück (DE); Juri Herzog, Tecklenburg (DE); Philipp Buss, Münster (DE); Lea Ratering, Wettringen (DE); Sebastian Hagemann, Hörstel (DE); Jannis Himpel, Ibbenbüren (DE)

(73) Assignee: B&W INTERNATIONAL GMBH, Ibbenbueren (DE)

( * ) Notice: Subject to any disclaimer, the term of this patent is extended or adjusted under 35 U.S.C. 154(b) by 0 days.

(21) Appl. No.: 17/010,098

(22) Filed: Sep. 2, 2020

(65) Prior Publication Data
US 2021/0070535 A1 Mar. 11, 2021

(30) Foreign Application Priority Data
Sep. 3, 2019 (DE) ...................... 10 2019 123 580.4

(51) Int. Cl.
*B65D 85/68* (2006.01)
*A45F 3/08* (2006.01)
*B62K 15/00* (2006.01)

(52) U.S. Cl.
CPC ............... *B65D 85/68* (2013.01); *A45F 3/08* (2013.01); *B62K 15/006* (2013.01); *B65D 2585/6862* (2013.01)

(58) Field of Classification Search
CPC .... B65D 85/68; B65D 2585/6862; A45F 3/08

USPC .......................................................... 206/335
See application file for complete search history.

(56) References Cited

U.S. PATENT DOCUMENTS

| 3,233,803 | A | | 2/1966 | Gray | |
|---|---|---|---|---|---|
| 3,968,913 | A | * | 7/1976 | Weed | B60R 9/10 224/488 |
| 4,180,111 | A | | 12/1979 | Davis | |
| 5,307,908 | A | * | 5/1994 | Shyr | A45C 7/0068 190/103 |
| 5,913,448 | A | | 6/1999 | Mann et al. | |
| 6,053,382 | A | | 4/2000 | Wyant | |
| 6,561,395 | B2 | * | 5/2003 | Lim | A45C 5/14 190/103 |
| 7,963,379 | B2 | * | 6/2011 | Roth | B62J 9/00 190/119 |
| 9,717,322 | B1 | | 8/2017 | Bergquist | |
| 2001/0031104 | A1 | | 10/2001 | Vazquez | |

(Continued)

FOREIGN PATENT DOCUMENTS

| DE | 10 2008 015 097 A1 | 9/2009 |
|---|---|---|
| EP | 2 272 773 A1 | 1/2011 |
| GB | 2 552 227 A | 1/2018 |

*Primary Examiner* — Jacob K Ackun
(74) *Attorney, Agent, or Firm* — WC&F IP

(57) ABSTRACT

A transport case for a folding bicycle has a base with a first wall element connected along an edge. A connection device can be used to fix the first wall element to an element of the transport case to produce an interior of a first volume. Another connection device can be used to fix the first wall element to an element of the transport case to produce an interior of a second volume. The first volume is bigger than the second volume.

15 Claims, 4 Drawing Sheets

(56) References Cited

U.S. PATENT DOCUMENTS

| | | | | |
|---|---|---|---|---|
| 2006/0102673 A1* | 5/2006 | Collier | ................ | A45C 7/0068 |
| | | | | 224/581 |
| 2007/0228096 A1* | 10/2007 | Lin | ..................... | A45C 9/00 |
| | | | | 224/576 |
| 2013/0292431 A1* | 11/2013 | Christian | ............ | A47K 10/185 |
| | | | | 224/164 |
| 2015/0266664 A1* | 9/2015 | Noer | ..................... | A45C 5/14 |
| | | | | 206/216 |
| 2015/0327639 A1 | 11/2015 | Antonelli | | |
| 2016/0374441 A1* | 12/2016 | Atlas | ................... | A45C 13/28 |
| | | | | 190/18 A |

* cited by examiner

TRANSPORT CASE FOR A FOLDING BICYCLE

FIELD OF THE INVENTION

The invention relates to transport case for a folding bicycle.

BACKGROUND

Folding bicycles have been known from the prior art for many years and are used in a wide variety of embodiments. They are especially advantageous if the folding bicycle is to be transported by, for example, commuters before being used. For instance, this relates to workers who travel by public transport, such as train or bus, to close to their place of work and then switch to the bicycle, this being a folding bicycle, which they have taken with them.

SUMMARY

Within the scope of the present invention, a folding bicycle is to be understood particularly to mean bicycles that can be folded up, i.e. their dimensions can be reduced. In the present case, a folding bicycle is also understood to mean other means of transport and vehicles that are powered by muscle strength and can be reduced and folded into different sizes and dimensions.

To transport such a folding bicycle in the folded-up state, it is practical—for several reasons—to transport the folding bicycle in a transport case. Bad weather and/or bad routes in particular may soil bicycle components, especially the wheels. Therefore, it is advantageous, especially for fellow travelers, to cover these dirty elements by transporting in a transport case, so that fellow travelers or parts of the public transport vehicle, such as the bus or the train, do not get dirty. If the folding bicycle is transported as an item of luggage, like when flying for example, it is practical to transport the folding bicycle in a transport case in order to prevent any damage to the folding bicycle.

In particular, conventional transport cases for folding bicycles have a rigid or stiff body, which is designed with a flap or a closable opening. The folding bicycle can be positioned in the transport case by way of the flap and/or the closable opening and thus transported in the transport case.

However, the disadvantage of such transport cases is that it is very difficult or perhaps even impossible to transport the transport case on the unfolded and prepared folding bicycle, as it is cumbersome and bulky.

The invention therefore aims to further develop a transport case for a folding bicycle such that, on the one hand, the folding bicycle can be transported in a safe and easy manner and, on the other hand, the transport case can be efficiently transported when the bicycle is not inside.

The invention solves the problem by way of a transport case for a folding bicycle, wherein the transport case comprises a base and at least a first wall element that is connected to the base along one edge of the base, wherein the first wall element can be fixed to an element of the transport case by means of a first connection device, so that an interior of the transport case has a first volume, and wherein the first wall element can be fixed to an element of the transport case by means of a second connection device, so that the interior of the transport case has a second volume, the first volume being greater than the second volume.

If the first wall element, which may be, for example, a front side of the transport case, is fixed to an element of the transport case by means the first connection device, the transport case has a greater volume, which is preferably so great that the folding bicycle can be accommodated in said volume when it is folded up. The transport case is then in a transportation state. The element to which the first wall element can be fixed by means of the first connection device is preferably a second wall element, wherein the first wall element and the second wall element preferably enclose the interior of the transport case completely, at least almost completely or at least on four sides, such that the wall elements only form, for instance, four side walls and an upper side, i.e. a side opposite the base is open. In this case, the interior of the transport case is preferably closed or closable. However, it is also possible that an opening is provided specifically on the side of the transport case that lies opposite the base.

If the first wall element is fixed to an element of the transport case by means of the second connection element, the interior has a second, smaller volume. As a result, the transport case itself is also smaller and in a state in which the folding bicycle is too large to be accommodated in the small second volume of the interior of the transport case.

If such a transport case is used, the folding bicycle is stored in the interior of the transport case, wherein the interior has the larger volume and thus the first wall element can be or is fixed to the element of the transport case by means of the first connection device. Preferably, the element of the transport case features an opening through which the folding bicycle can be introduced into the interior of the transport case and which is closed by fixing the first wall element to the corresponding element of the transport case by means of the first connection device.

In this state, the folding bicycle can be transported inside the transport case. The base, which preferably comprises a rigid board, for example made of a plastic, wood or metal, provides sufficient stability to transport the folding bicycle, for instance when upright.

Upon arriving at the destination, the folding bicycle can be removed from the interior of the transport case. The first wall element is removed by releasing the first connection element from the element of the transport case; at the very least, the fastening is released. Instead, the first wall element is now fixed to an element of the transport case by means of the second connection device, so that the interior and therefore the transport case itself are smaller. In this state, the transport case can be easily transported on the folding bicycle. In a preferred configuration, the transport case can be fixed on the folding bicycle, for instance on the handlebars or the pannier rack. To this end, it is advantageous if the transport case has at least one fixing element that is designed to be connected to the corresponding component of the folding bicycle.

In a preferred configuration, the transport case can be used as a rucksack when the first wall element is fixed by means of the second connection device, wherein the base of the transport case is preferably arranged in such a way that it faces a back of the wearer of the rucksack. In this state, the transport case can not only be easily transported, but it performs an additional function in that other items of luggage, such as a jacket or a bag, can be transported in the transport case that is used as a rucksack. Alternatively or additionally, the transport case features at least one fixing element for fixing the transport case to a component of the folding bicycle, for instance on the handlebars or a pannier rack.

Preferably, the first connection device and/or the second connection device is a positive-locking connection device. It is especially preferable if both connection devices are positive-locking devices. In this case, the first connection device and/or the second connection device may feature at least one zip or at least one velcro fastener (a hook and loop fastener). Press studs, latch elements or other positive-locking devices are also possible. The use of zips or velcro fasteners in particular renders the respective connection device especially easy to release, so that it is particularly easy to move the first wall element from a state in which it is fixed by means of the first connection device into a state in which it is fixed by means of the second connection device.

Independently of this, the first wall element is connected to the base along an edge of said base. This may be achieved, for example, via hinges, especially film hinges, or via flexible and/or elastic fabric panels.

Preferably, the positive-locking element of the first connection device is also a positive-locking element of the second connection device, wherein this positive-locking element is preferably arranged on the first wall element. If the two connection devices refer to zips, for instance, one of the zip elements is arranged on the first wall element and the other zip element of the respective zips on the respective other element. If these positive-locking elements, i.e. the zip parts, on the respective elements are designed in such a way that the length, distance and shape of the individual teeth of the zip are designed to be identical or at least almost identical, they can both form a positive-locking connection with the same zip element, which in this case is arranged on the first wall element. This particularly simple form is also possible with velcro fasteners. A velcro fastener that is arranged on the first wall element can come into contact with velcro fastener counter elements on different elements and components of the transport case, thereby forming the first connection device or the second connection device.

At least two tabs are preferably arranged on the base, wherein said tabs can be brought into a first position, in which they cover the base, preferably on its outer side, and into a second position, wherein preferably shoulder straps can be accessed from outside when the at least two tabs are in the second position. This configuration has several advantages. If the transport case is used to transport the folding bicycle, at least two tabs are preferably in the first position. They then cover, preferably completely, an outer side of the base, which is the side facing towards the outside world and away from the interior of the transport case. Consequently, it is the side that may get dirty, for instance, when transporting the transport case.

Conversely, if the transport case is used, for example, as a rucksack, wherein the base is preferably arranged on the back of the wearer, it is advantageous to bring the tabs into the second position. As a result, the potentially dirty side of the tabs is arranged in such a way that it does not come into contact with the potentially delicate clothing of the wearer. Rather, a fresh, i.e. clean, outer side of the base comes into contact with the back of the wearer and thus also with the clothing of the wearer. In addition, the shoulder straps that are required to be able to use the transport case as a rucksack are preferably situated between the outer side of the base, which can be covered by the tabs, and the tabs themselves. The positioning of the shoulder straps at this point has the advantage that, on the one hand, they are available when they are needed and, on the other hand, they are not accessible and therefore do not disturb, and they cannot lead to any problems, when they are not in use.

Preferably, at least one positive-locking element is found on the at least two tabs, but preferably in each case at least one positive-locking element of the second connection device. It has been proven advantageous if the at least two tabs are arranged along edges of the base, wherein said edges preferably form a right angle with the edge of the base to which the first wall element is connected. The tabs can then be swiveled about this edge when being brought from the first position into the second position. They then preferably form a right angle or at least almost a right angle with the base, so that its side that is protected from dirt, which faces towards the base of the transport case when it is in the first position, is now arranged on the outer side of the transport case. If there is at least one positive-locking element of the second connection device at this point, the first wall element with its positive-locking element can now be fixed to this positive-locking element, wherein the two positive-locking elements form a second connection device. This connection ensures that the positive-locking elements of the second connection device, which are situated on the tabs, are protected from dirt and damages while the transport case is being used as a transport case for a folding bicycle.

Preferably, the first wall element can be fixed to a second wall element by means of the first connection device, wherein a loading opening is preferably situated between the first wall element and the second wall element through which the first volume can be accessed when the first wall element is fixed neither by means of the first connection device nor the second connection device to another element of the transport case. In this state, the first wall element is preferably only arranged on the edge of the base. It can preferably be swiveled about this edge, causing the loading opening to open fully and preferably freeing the entire cross-section of the interior of the transport case. This renders it especially easy to put the folding bicycle into the interior of the transport case. If the first wall element is subsequently fixed to the second wall element by means of the first connection device, the interior is preferably completely closed and the folding bicycle protected from damage and dirt inside the interior of the transport case.

The base preferably has a plastic board, which preferably features a plurality of openings and/or hollow chambers, preferably circular, oval or polygonal, especially preferably hexagonal openings and/or hollow chambers or square openings and/or hollow chambers; it is especially preferable if it has a honeycomb structure. On the one hand, this enables a sufficient stability for the base of the transport case and, where applicable, the back panel of the rucksack; on the other hand, it saves on weight, so that the transport case is lightweight. Furthermore, a folding bicycle inside the transport case is protected against external forces, in particular lateral forces.

The transport case preferably has at least two castors, which are especially preferably arranged at the ends of the edges, on which the first wall element is positioned on the base of the transport case. A grip element, such as a tab or a loop, is preferably situated on the opposite edge or side of the transport case. If there is a folding bicycle inside the transport case, the transport case can be lifted up by way of this grip element, so that the only contact between the transport case and the ground occurs via the castors, such that the transport case can be easily pulled and moved using the castors.

Preferably, the first volume of the interior of the transport case is designed in such a way that, in addition to the folding bicycle, at least one other item of luggage, such as a clothing bag, can be accommodated in the interior. This clothing bag can be used to transport, for example, items of clothing that are needed at the destination. It is especially preferable if the clothing bag is positioned inside the interior of the transport case relative to the folding bicycle in such a way that delicate structural elements of the folding bicycle are cushioned and thus protected against external impacts, for example. The clothing bag is preferably made of a resistant material, in particular a waterproof material, in order to protect the items of clothing inside the clothing bag from dirt and damage that may be caused by the folding bicycle.

Preferably, the clothing bag can also be positioned in the interior of the transport case if it has the second volume, i.e. the first wall element is fixed to an element of the transport case by means of the second connection device. This is especially advantageous if the transport case is used as a rucksack. The clothing bag then serves as an inner bag or inner case for the transport case and can also easily be transported when filled. Conversely, if the clothing bag is empty, it ensures a waterproof, resistant accommodation space inside the interior of the transport case when in this position.

The clothing bag preferably features at least one strap, so that it can also be used as a rucksack or sports bag. The size can preferably be adjusted by, for example, turning a part of the clothing bag inwards. This halves the volume of the clothing bag, as the outer wall is doubled.

DESCRIPTION OF THE DRAWINGS

In the following, an example of an embodiment of the present invention will be explained in more detail by way of the attached figures: They show FIG. 1A—a side view of a transport case in a closed position, FIG. 1B—a side view of the transport case in an open position, FIG. 2—a view of the transport case from below, FIG. 3—a view from below with unfolded tabs and FIG. 4—the representation of the transport case in the second state.

DETAILED DESCRIPTION

Figure 1A:
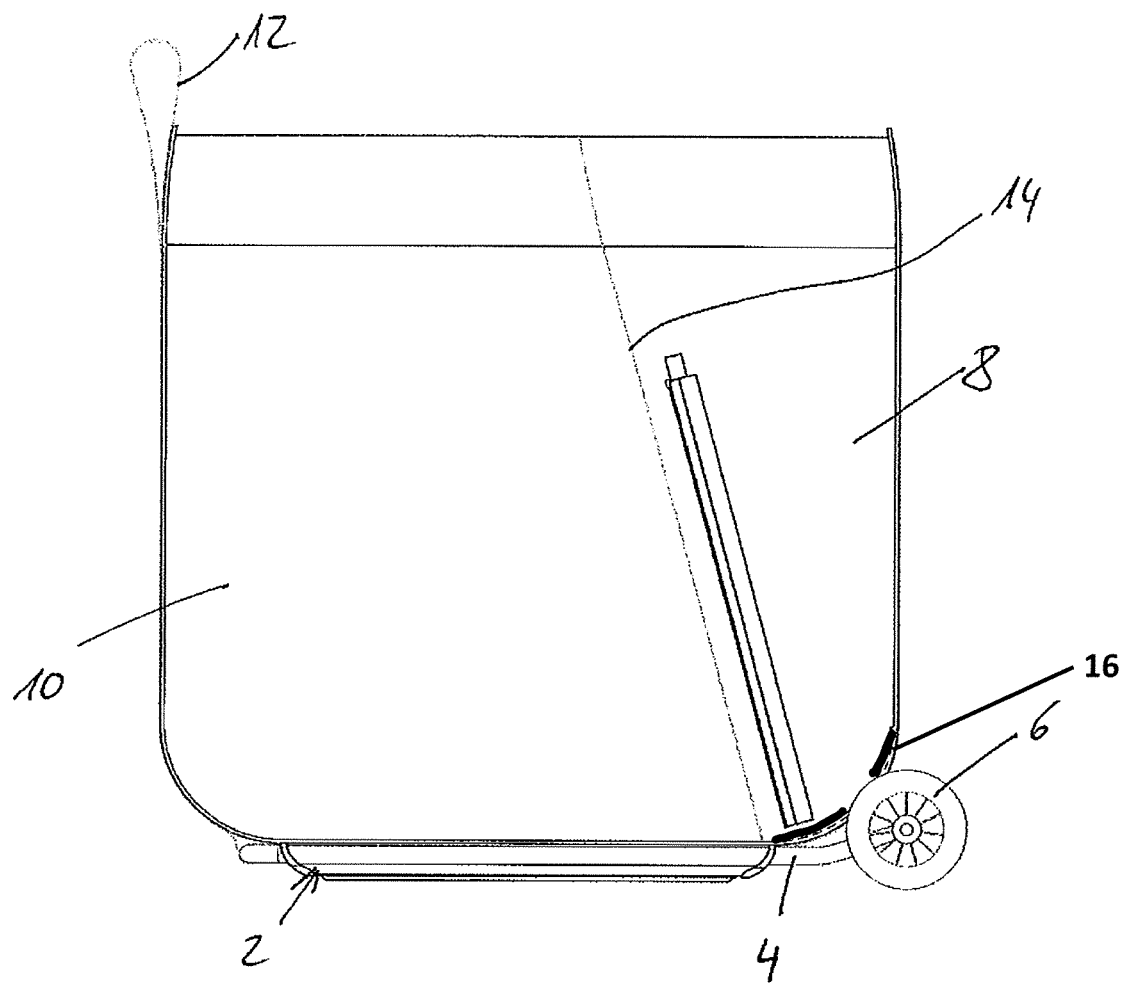

FIG. 1A depicts a transport case according to a first example of an embodiment of the present invention. It has a base 2, which features a frame 4 that affords the base 2 sufficient stability. The frame 4 has two wheels 6, by means of which the transport case can be moved. Above the base 2 is a first wall element 8 and a second wall element 10 which, together with the base 2, completely enclose the interior of the transport case. A drawbar eye 12 is situated on the second wall element 10. The transport case can be lifted up by said drawbar eye until the only contact between the transport case and the ground is via the wheels 6. In this state, the transport case can be easily moved.

Figure 1B:
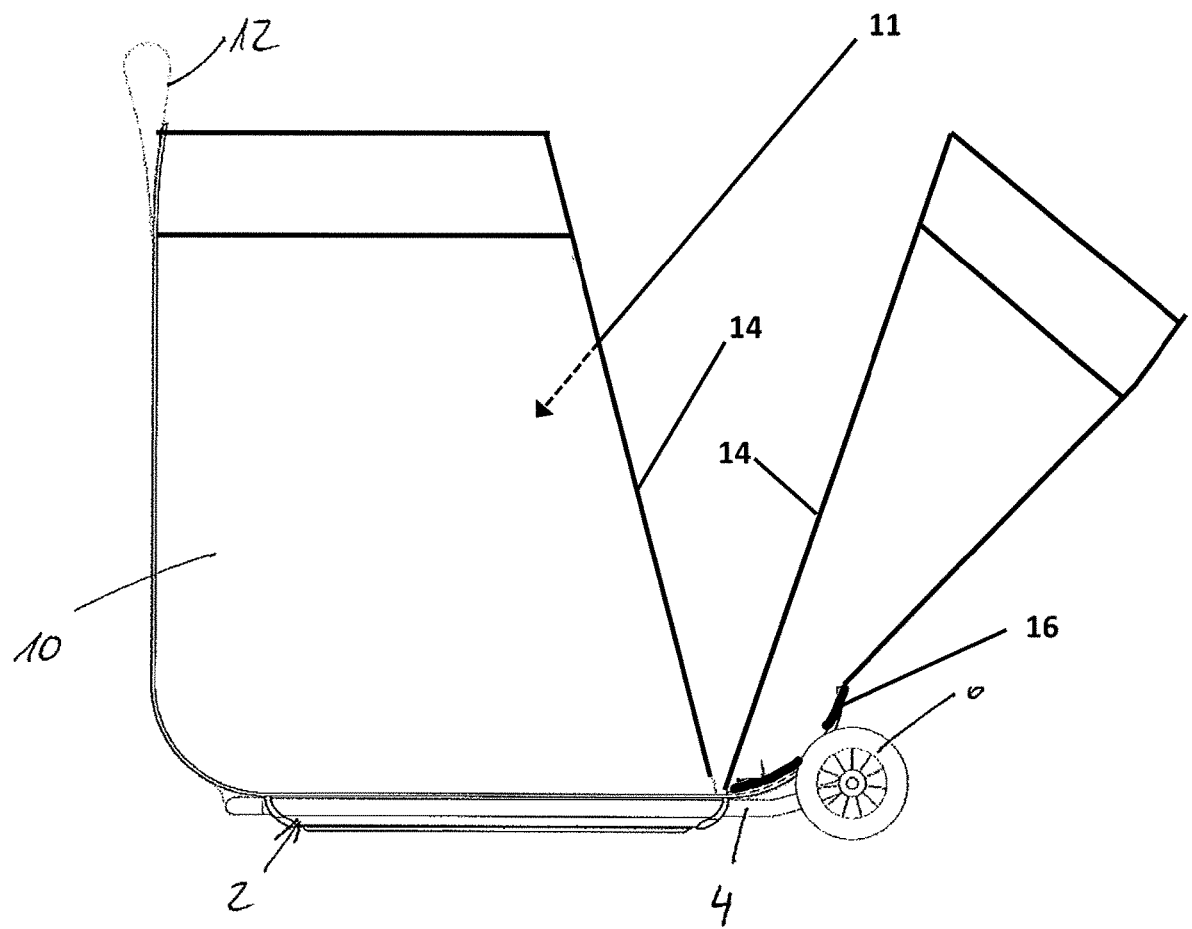

The first wall element 8 is fixed to the second wall element 10, supported on the base 2 by means of a first connection device 14, only depicted schematically, that is designed as a zip in the example of an embodiment shown. In this state, the interior of the transport case has the first volume, which is large enough to accommodate a folding bicycle. To this end, in the example of an embodiment shown, the first connection device 14 is released, such that the first wall element 8, which is connected to the base 2 along an edge 16, can be swivelled about the edge 16 relative to the base 2. As This creates an opening 11, as shown in FIG. 1B, through which a folding bicycle can be pushed into the second wall element 10. Use is subsequently restored via the first connection element 14 and the transport case closed, as shown in FIG. 1A.

Figure 2:
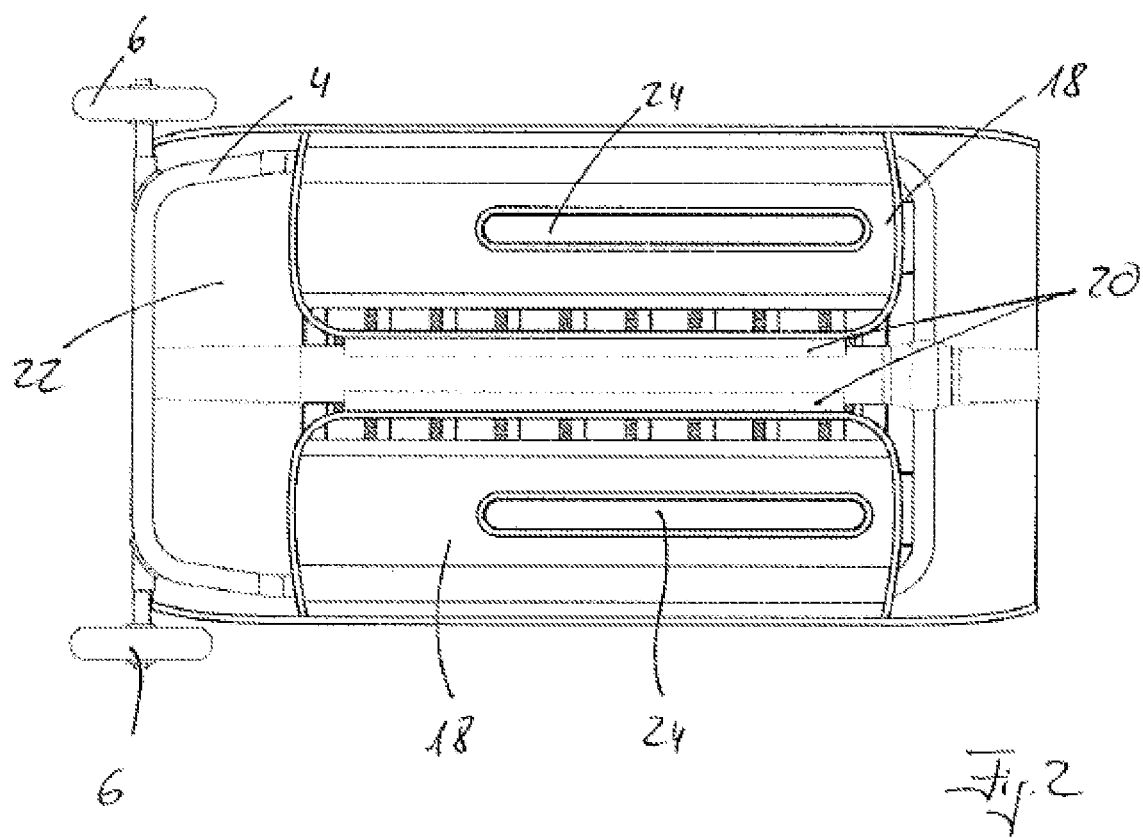

FIG. 2 shows a view of the transport case from FIG. 1 from below. The frame 4 of the base 2 and the two wheels 6 are visible. Two tabs 18 are situated on the base 2, said tabs being fixed to a plastic board 22 via, for example, velcro elements 20. The plastic board 22 with the frame 4 forms part of the base and ensures sufficient stability. The two tabs 18 feature protective strips 24, which, in the position of the transport case shown in FIG. 1A, come into contact with the ground and serve to protect the lower side of the base 2 of the transport case.

Figure 3:
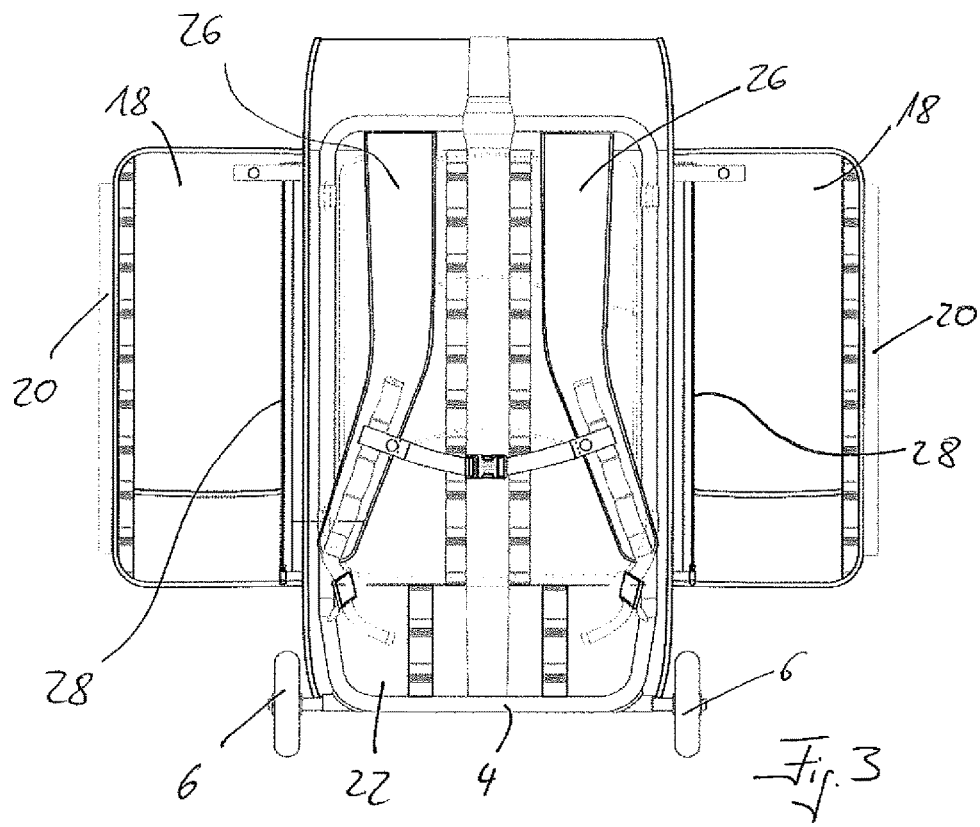

FIG. 3 depicts the representation from FIG. 2, rotated by 90°, with open tabs 18. The velcro elements 20 have been released and the tabs 18 unfolded. The wheels 6, the frame 4 and the plastic board 22 still form the base 2. By unfolding the tabs 18, two shoulder straps 26 become accessible from outside. In the representation in FIG. 2, they are arranged between the tabs 18 and the plastic board 22 and as such are not visible. Thanks to these shoulder straps 26, the transport case can be used as a rucksack.

Parts of the second connection device 28 can be seen on the unfolded tabs 18. This refers to a zip part, which can engage with a part of the zip that forms the first connection device 14.

Figure 4:
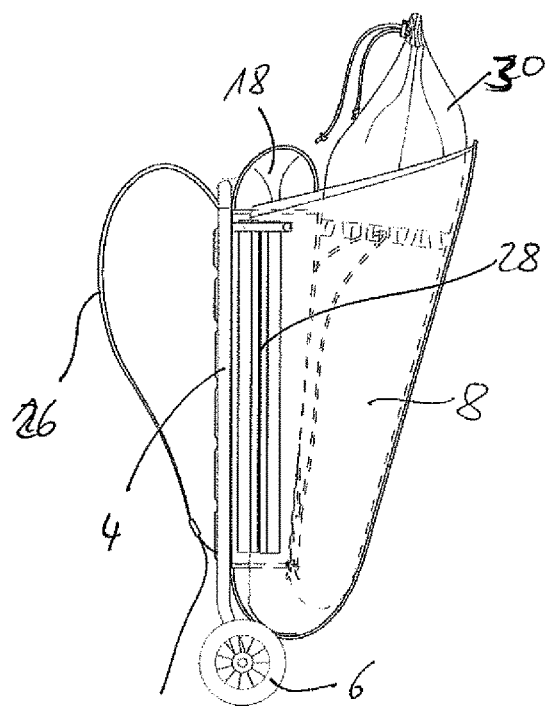

FIG. 4 depicts how the transport case can be used as a rucksack from a side view. The frame 4 of the base 2 faces the back of a user, not depicted. The shoulder straps 26 are released so far from the base 2 that they are only connected to it at the upper and lower ends and can therefore be used as shoulder straps 26. The wheels 6 are situated at the lower end of the base 2. A part of the first wall element 8 is folded inwards, such that the first wall element 8 is fixed to the tabs 18 via the second connection device 28. As a result, the interior of the transport case has become smaller and now only contains the second volume.

In FIG. 4, a clothing bag 30 is now situated in this interior. This may be designed to be waterproof and made of durable material, thereby forming an inner bag or inner case in which the transported item is safely stored. This is especially advantageous with small transported items, as there may be small spaces and gaps between individual parts of the transport case, such as the base 2, the first wall element 8 and the tabs 18, through which small items could disappear. The cloths bag 30 avoids this situation.

REFERENCE LIST 2 base
4 frame
6 wheel
8 first wall element
10 second wall element
12 drawbar eye
14 first connection device
16 edge
18 tab
20 velcro element
22 plastic board
24 protective strips
26 shoulder strap
28 second connection device
30 clothing bag

What is claimed is:

1. A transport case for a folding bicycle, comprising
a base, having an edge;
a first wall element, connected to the base along the edge of the base;

a second wall element, supported by the base;

a first connection device, configured to releasably fix the first wall element to the second wall element; and a second connection device, configured to releasably fix the first wall element to the base, via at least two tabs fixed to the base, at a swivel position about the edge of said base, wherein:

the first wall element when, in combination, not fixed by the first connection device and not fixed by the second connection device, is movable, in a swivel movement about the edge of base, between a position at which the first wall element is fixed when fixed by the first connection device to the second wall element and the swivel position at which the first wall element is fixed, when fixed to the base via the at least two tabs by the second connection device and, an interior of the transport case, enclosed by the first wall element, the second wall element, and the base when the first wall element is fixed to the second wall element by the first connection device, has a first volume, the interior of the transport case, enclosed by the base and the first wall element when fixed to the base by the second connection device, has a second volume, the first volume is larger than the second volume.

2. The transport case of claim 1, further comprising shoulder straps connected to the base, and wherein the transport case is configurable for use as a rucksack when the first wall element is fixed to the base by the second connection device, the configuration including the base and the shoulder straps being configured such that, when used as a rucksack the base faces a back of a wearer of the rucksack.

3. The transport case of claim 1, wherein the first connection device is a positive-locking connection device, or the second connection device is a positive-locking connection device, or the first connection device is a positive-locking connection device and the second connection device is a positive-locking connection device.

4. The transport case of claim 3, further comprising:

a positive-locking connection element on the first wall element;

a positive-locking connection element on the second wall element; and another positive locking connection element on each of the at least two tabs, wherein the positive-locking connection element on the first wall element and the positive-locking connection element on the second wall element are configured to function, in combination, as the first connection device, and the positive-locking connection element on the first wall element and the positive-locking connection device on the at least two tabs are configured to function, in combination, as the second connection device.

5. The transport case of claim 2, further comprising:

shoulder straps, connected to an outer side of the base that faces away from the first wall element and the second wall element, wherein the at least two tabs are fixed to the base in a movable configuration, movable between a first position, in which they cover the shoulder straps on the outer side of the base, and a second position, in which the shoulder straps are accessible.

6. The transport case of claim 5, further comprising at least one positive-locking element located on the at least two tabs, configured to releasably fix the at least two tabs in the first position.

7. The transport case of claim 1 wherein the first wall element when released from being fixed to the second wall element by the first connection device, in combination with being not fixed by the second connection device is movable, in a swivel movement about the first edge of the base, to a position creating a loading opening that is situated between the first wall element and the second wall element, through which the first volume can be accessed.

8. The transport case of claim 1, wherein the base comprises a frame and a plastic board.

9. The transport case of claim 1 wherein the first connection device is a positive locking connection device that comprises at least one zip fastener or at least one hook and loop fastener.

10. The transport case of claim 6 wherein the at least one positive-locking element located on the at least two tabs forms a part of the second connection device.

11. The transport case of claim 8 wherein the plastic board features a plurality of openings, or a plurality of hollow chambers, or both.

12. The transport case of claim 8 wherein the plastic board features a plurality of openings that are circular or hexagonal, or the plastic board features a plurality of hollow chambers that are circular or hexagonal, or the plastic board features a plurality of openings that are circular or hexagonal and features a plurality of hollow chambers that are circular or hexagonal.

13. The transport case of claim 11 wherein the plurality of openings or the hollow chambers, or both, are configured as a honeycomb structure.

14. The transport case of claim 1, further comprising at least one tab that is connected to the base, wherein the second connection device is configured to releasably fix the first wall element relative to the base by releasably connecting the first wall element to the at least two tabs.

15. The transport case of claim 14, wherein the base comprises a frame and a plastic board, and the at least two tabs are connected to the plastic board.

* * * * *